(12) United States Patent
Anderson

(10) Patent No.: US 9,990,770 B2
(45) Date of Patent: Jun. 5, 2018

(54) USER-TO-USER COMMUNICATION ENHANCEMENT WITH AUGMENTED REALITY

(75) Inventor: Glen J. Anderson, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 665 days.

(21) Appl. No.: 13/977,552

(22) PCT Filed: Dec. 20, 2011

(86) PCT No.: PCT/US2011/066170
§ 371 (c)(1),
(2), (4) Date: Jun. 28, 2013

(87) PCT Pub. No.: WO2013/095383
PCT Pub. Date: Jun. 27, 2013

(65) Prior Publication Data
US 2013/0293584 A1    Nov. 7, 2013

(51) Int. Cl.
*G06T 19/00* (2011.01)
*G06T 11/00* (2006.01)
(Continued)

(52) U.S. Cl.
CPC ............ *G06T 19/006* (2013.01); *G01C 21/20* (2013.01); *G06F 3/011* (2013.01); *G06F 3/017* (2013.01); *G06F 3/0346* (2013.01); *G06F 3/04815* (2013.01); *G06T 11/00* (2013.01); *H04L 67/38* (2013.01); *H04M 1/72547* (2013.01); *H04M 2250/10* (2013.01); *H04M 2250/12* (2013.01); *H04M 2250/52* (2013.01); *H04W 4/02* (2013.01)

(58) Field of Classification Search
None
See application file for complete search history.

(56) References Cited

U.S. PATENT DOCUMENTS 6,784,901 B1 *  8/2004  Harvey ............... H04L 12/1827
                                                        709/204
2002/0032623 A1 *  3/2002  Wheeler ............. G06Q 10/087
                                                        705/28
(Continued)

FOREIGN PATENT DOCUMENTS

WO    WO 2011-084720         7/2011

OTHER PUBLICATIONS

PCT Search Report, PCT/US2011/066170, Intel Corporation, dated Aug. 31, 2012, 8 pages.
(Continued)

*Primary Examiner* — Ulka Chauhan
*Assistant Examiner* — Patrick F Valdez
(74) *Attorney, Agent, or Firm* — Womble Bond Dickinson (US) LLP

(57) ABSTRACT

The enhancement of user-to-user communication with augmented reality is described. In one example, a method includes receiving virtual object data at a local device from a remote user, generating a virtual object using the received virtual object data, receiving an image at the local device from a remote image store, augmenting the received image at the local device by adding the generated virtual object to the received image, and displaying the augmented received image on the local device.

24 Claims, 12 Drawing Sheets

(51) Int. Cl.
*H04L 29/06* (2006.01)
*G01C 21/20* (2006.01)
*G06F 3/01* (2006.01)
*H04M 1/725* (2006.01)
*G06F 3/0346* (2013.01)
*G06F 3/0481* (2013.01)
*H04W 4/02* (2018.01)

(56) References Cited

U.S. PATENT DOCUMENTS

| | | | | |
|---|---|---|---|---|
| 2007/0035563 | A1* | 2/2007 | Biocca | G06F 3/0346 345/633 |
| 2008/0104018 | A1* | 5/2008 | Xia | G06F 9/4443 |
| 2009/0193106 | A1* | 7/2009 | Bouten | H04L 12/1822 709/223 |
| 2010/0045619 | A1 | 2/2010 | Birnbaum et al. | |
| 2010/0075712 | A1* | 3/2010 | Sethuraman | H04M 1/6041 455/556.1 |
| 2010/0156781 | A1 | 6/2010 | Fahn | |
| 2011/0055733 | A1* | 3/2011 | Hamilton, II | A63F 13/10 715/757 |
| 2011/0300876 | A1* | 12/2011 | Lee | G01C 21/3438 455/456.1 |
| 2011/0304629 | A1* | 12/2011 | Winchester | G06T 13/40 345/473 |
| 2011/0306366 | A1 | 12/2011 | Trussel et al. | |
| 2012/0081393 | A1* | 4/2012 | Kim | G06F 3/011 345/633 |
| 2012/0306775 | A1* | 12/2012 | Miyachi | G06F 3/03545 345/173 |
| 2012/0314936 | A1* | 12/2012 | Ishige | G06T 19/006 382/154 |
| 2013/0086609 | A1* | 4/2013 | Levy | G06Q 30/0277 725/36 |
| 2013/0116922 | A1* | 5/2013 | Cai | G01C 21/206 701/515 |
| 2013/0310063 | A1* | 11/2013 | Joy | H04L 67/2814 455/456.1 |
| 2014/0015858 | A1* | 1/2014 | Chiu | G09G 5/026 345/633 |

OTHER PUBLICATIONS

European Search Report for EP Counterpart Application No. 11878240, 4 pgs., dated Jul. 15, 2015.

* cited by examiner

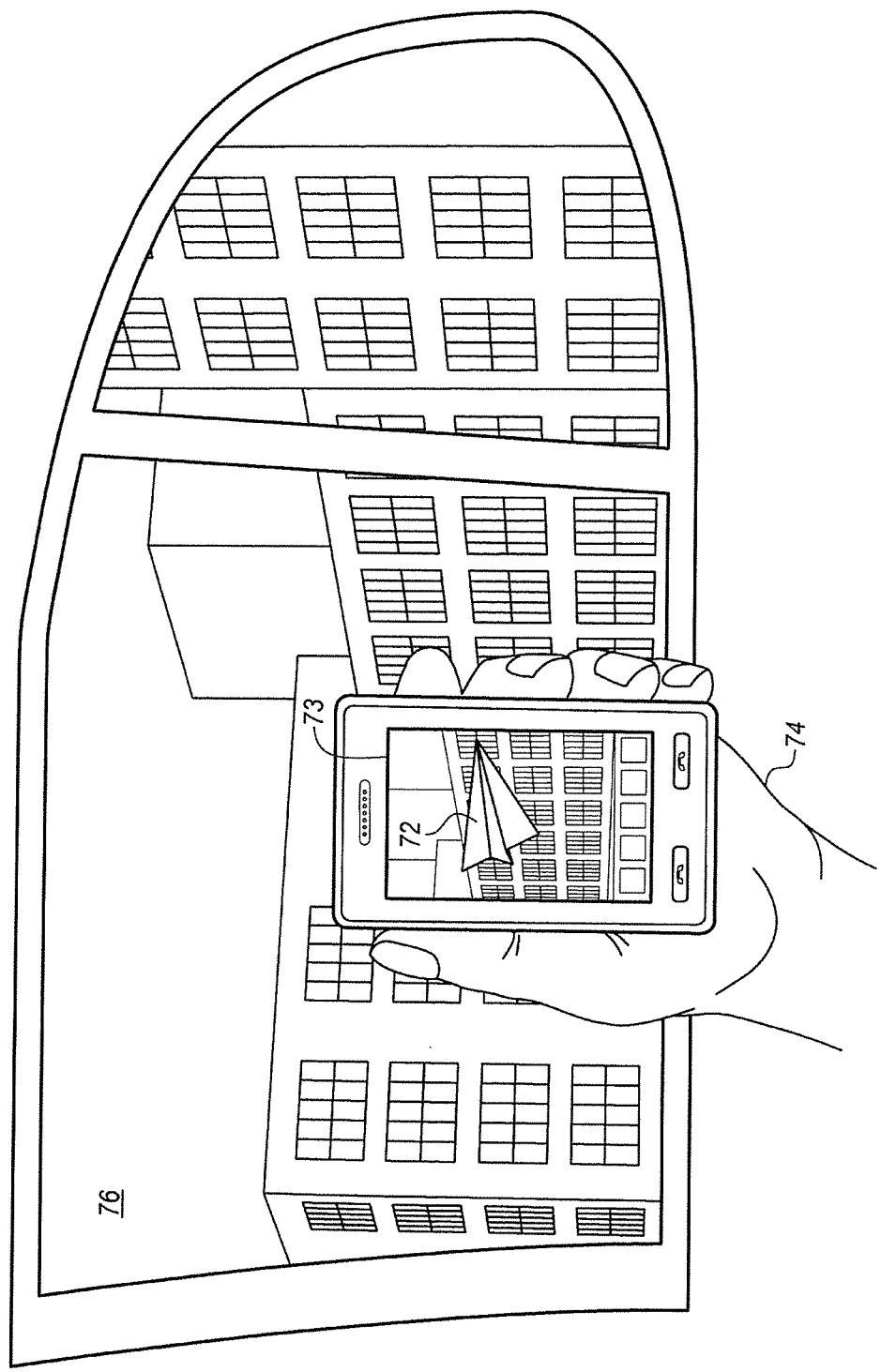

USER-TO-USER COMMUNICATION ENHANCEMENT WITH AUGMENTED REALITY

CROSS-REFERENCE TO RELATED APPLICATION

This patent application is a U.S. National Phase Application under 35 U.S.C. § 371 of International Application No. PCT/US2011/066170, filed Dec. 20, 2011, entitled "USER-TO-USER COMMUNICATION ENHANCEMENT WITH AUGMENTED REALITY".

BACKGROUND

Augmented Reality (AR) includes techniques for showing virtual objects superimposed over an image of a real place. In a simple example, the image is a view of a street that includes a restaurant and this reality is augmented by adding the name of the restaurant superimposed over the image of the restaurant. This has been expanded to include menus, reviews, friends that are inside, and other information. The image may be a video sequence of images. Smartphone applications have been proposed or developed which allow the user to point a camera phone at a location and see the location on the smartphone display. The application then obtains data about the location, such as restaurant names, etc. and then augments the reality shown in the smartphone display with the names, menus, reviews, etc.

AR techniques have also been used to mix real world video with three-dimensional graphics. In one example AR is used to superimpose virtual people or animals over a video feed of a real scene. In some cases, the real scene is observed by a camera and a person standing in the scene can then make gestures that are observed by the camera and used to provide interactivity between the real person and the virtual person or animal. This interaction between the real person and the virtual person cannot be seen directly by the real person, but through a display that shows the augmented reality view. This view includes the real scene, the real person, and the virtual person.

Mobile Augmented Reality (MAR) is a technology for applying games to existing maps. In MAR, a map or satellite image is used as a playing field and other players, obstacles, targets, and opponents are added to map. Navigation devices and applications also show a user's position on a map using a symbol or an icon. Geocaching and treasure hunt games have also been developed which show caches or clues in particular locations over a map.

These techniques all use maps that are retrieved from a remote mapping, locating, or imaging service. In some cases the maps show real places that have been photographed or charted while in other cases the maps may be maps of fictional places. The stored maps may not be current and may not reflect current conditions. This may make the augmented reality presentation seem unrealistic, especially for a user that is in the location shown on the map.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 7C is a diagram of a real scene from a local sensor augmented with a virtual object sent by another user according to another embodiment of the invention.

DETAILED DESCRIPTION

Embodiments of the invention allow a sender to send an augmented reality message to a receiver. The AR message may be enhanced by taking advantage of local sensor data of the sender and receiver's messaging devices. This may include knowing when the receiver is looking at the AR message. The AR message may be sent subsequent to or in parallel with another communication. The other communication may be in the form or notifications that the sender is making an associated AR object appear to a receiver.

Portable devices, such as cellular telephones and portable media players offer many different types of sensors that can be used to gather information about the surrounding environment. Currently these sensors include positioning system satellite receivers, cameras, a clock, and a compass, additional sensors may be added in time. These sensors allow the device to have situational awareness about the environment. The device may also be able to access other local information including weather conditions, transport schedules, and the presence of other users that are communicating with the user.

This data from the local device may be used to make an updated representation on a map or satellite image that was created at an earlier time. The actual map itself may be changed to reflect current conditions.

In one example, a user sends a message to another user by sending a virtual paper airplane. The airplane may be launched off of any device by pressing a button or making a touch screen gesture. The sender sees the paper airplane message from the time it leaves the sender through its flight to the recipient and all the way to a virtual representation of the user receiving it. In one example, the paper airplane flies out of the roof of the user's house superimposed over e.g. a satellite image of the area near the user's house. It is then represented as flying through the air on the satellite image all the way to the receiver. The representation may end on the roof of the user's house or may continue on to show the recipient virtually receiving the paper airplane.

From the receiver's perspective AR can be used to enhance the receiver's experience. The recipient receives an alert that a message is on its way, and the recipient may look for the augmented reality paper airplane through his or her phone screen. AR techniques may be used to allow the receiver to view the paper airplane and interact with it using the receiver's device. The receiver may also send a confirmation using avatars, emoticons or other techniques.

In one example, satellite images from for example, Google™ Earth may be downloaded, based on the user's GPS (Global Positioning System) position. The downloaded image may then be transformed with sensor data that is gathered with a user's smart phone. The satellite images and local sensor data may be brought together to create a realistic or styled scene which is displayed on the user's phone for communications.

Figure 1:
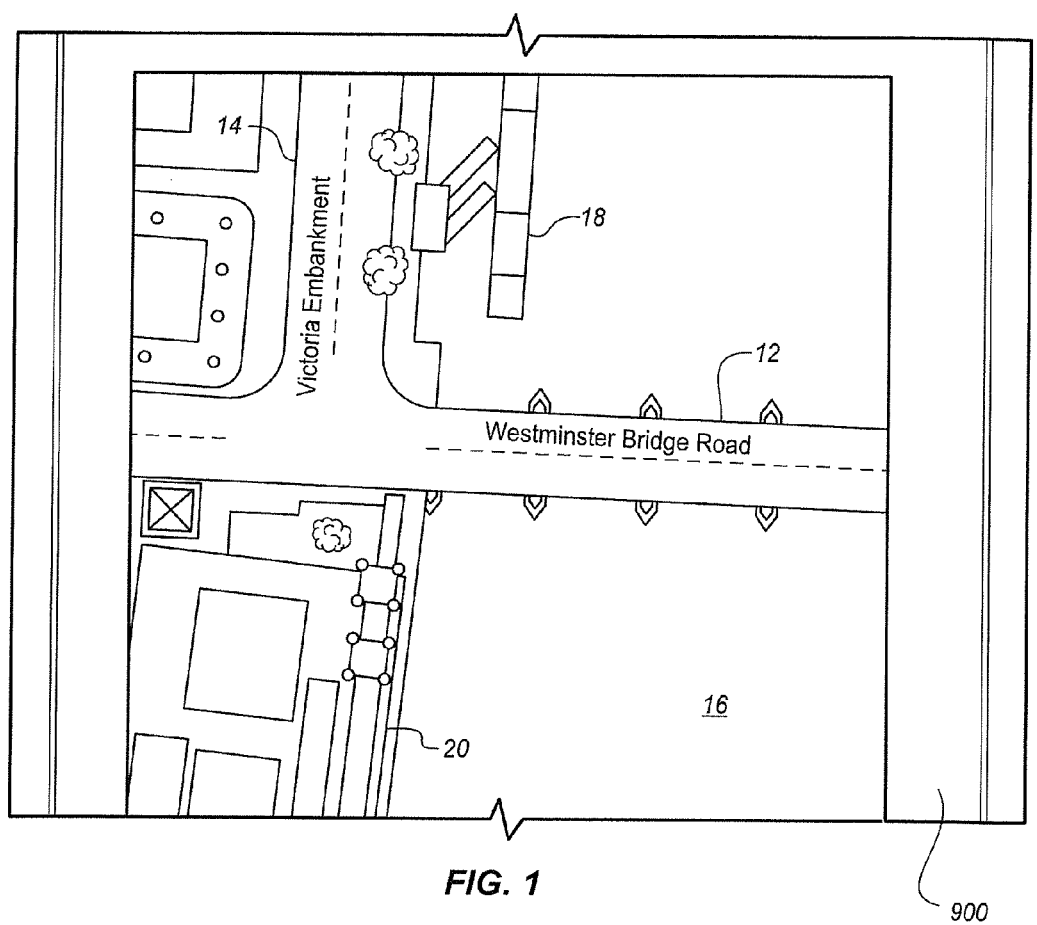
FIG. 1 is diagram of a real scene from a remote image store suitable for AR representations according to an embodiment of the invention.

FIG. 1 is a diagram of an example of a satellite image downloaded from an external source. Google provides such images as do many other Internet source. The image may be retrieved as it is needed or retrieved in advance and then read out of local storage. For games, the game supplier may provide the images or provide a link or connection to an alternate source of images that may be best suited for the game. This image shows Westminster Bridge Road 12 near the center of London England and its intersection with the Victoria Embankment 14 near Westminster Abbey. The water of the Thames River 16 lies beneath the bridge with the Millennium Pier 18 on one side of the bridge and the Parliament buildings 20 on the other side of the bridge. This image will show the conditions at the time that the satellite image was taken, which was in broad daylight and may be any day of any season within the last five or maybe even ten years.

Figure 2:
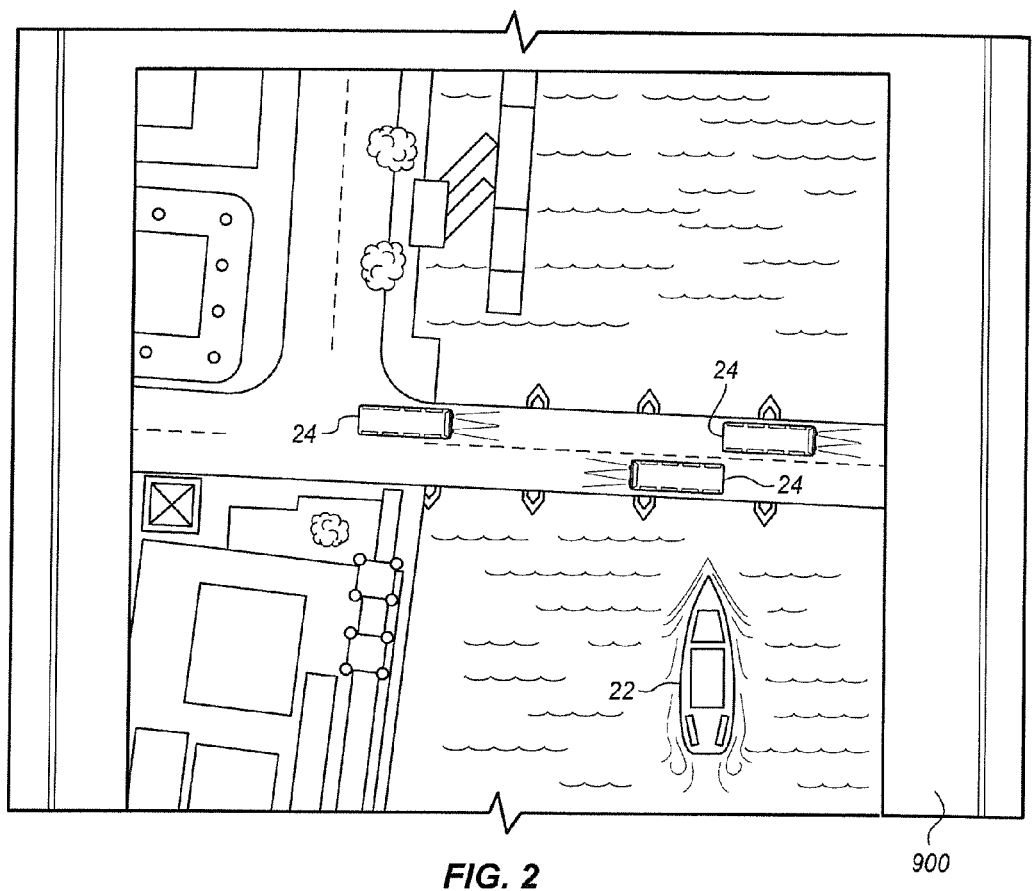
FIG. 2 is diagram of the real scene of FIG. 1 showing real objects augmenting the received image according to an embodiment of the invention.

FIG. 2 is a diagram of the same satellite image as shown in FIG. 1 with some enhancements. First, the water of the Thames River has been augmented with waves to show that it is a windy day. There may be other environmental enhancements that are difficult to show in a diagram, such as light or darkness to show the time of day and shadows along the bridge towers and other structures, trees and even people to indicate the position of the sun. The season may be indicated by green or fall leaf colors or bareness on the trees. Snow or rain may be shown on the ground or in the air, although snow is not common in this particular example of London.

In FIG. 2, the diagram has been augmented with tour buses 24. These busses may have been captured by the camera of the user's smart phone or other device and then rendered as real objects in the real scene. They may have been captured by the phone and then augmented with additional features, such as colors, labels, etc as augmented reality objects. Alternatively, the buses may have been generated by the local device for some purpose of a program or display. In a simple example, the tour bus may be generated on the display to show the route that a bus might take. This could aid the user in deciding whether to purchase a tour on the bus. In addition, the buses are shown with bright headlight beams to indicate that it is dark or becoming dark outside. A ship 22 has also been added to the diagram. The ship may be useful for game play for providing tourism or other information or for any other purpose.

Figure 3:
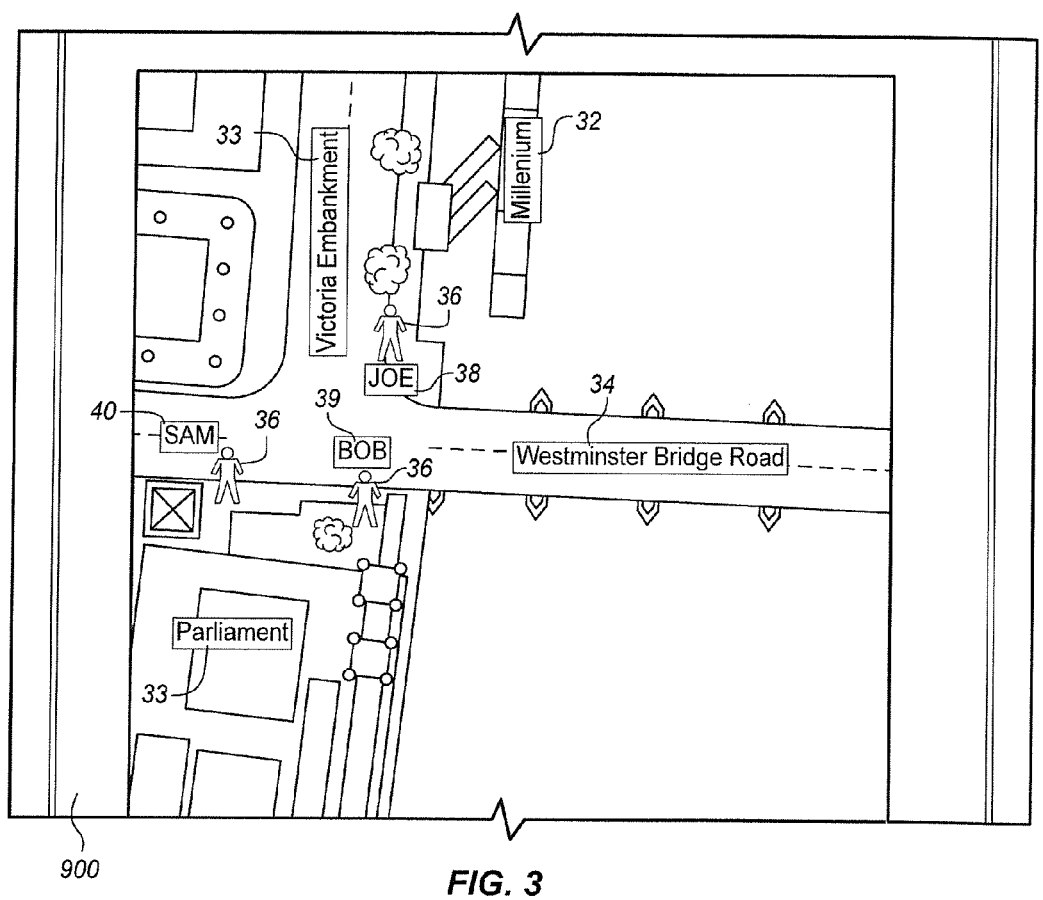
FIG. 3 is diagram of the real scene of FIG. 1 showing real objects enhanced by AR techniques according to an embodiment of the invention.

FIG. 3 is a diagram of the same satellite map showing other augmentations. The same scene is shown without the augmentations of FIG. 2 in order to simplify the drawing, however, all of the augmentations described herein may be combined. The image shows labels for some of the objects on the map. These include a label 34 on the road as Westminster Bridge Road, a label 32 on the Millennium Pier, and a label 33 on the Houses of Parliament. These labels may be a part of the received archival image or may be added by the local device.

In addition, people 36 have been added to the image. These people may be generated by the local device or by game software. In addition, people may be observed by a camera on the device and then images, avatars, or other representations may be generated to augment the received image from the archive or image store. An additional three people are labeled as Joe 38, Bob 39, and Sam 40. These people may be generated in the same way as the other people. They may be observed by the camera on the local device, added to the scene a image, avatars, or in another way and then labeled. The local device may recognize them using face recognition, user input, or in some other way.

As an alternative, these identified people may send a message from their own smart phones indicating their identity. This might then be linked to the observed people. The other users may also send location information, so that the local device adds them to the received image at the identified location. In addition, the other users may send avatars, expressions, emoticons, messages or any other information that the local device can use in rendering and labeling the identified people 38, 39, 40. In The camera when the camera sees these people, recognizes them Additional real or observed people, objects, and things may also be added. For example augmented reality characters may also be added to the image, such as game opponents, resources, or targets.

Figure 4:
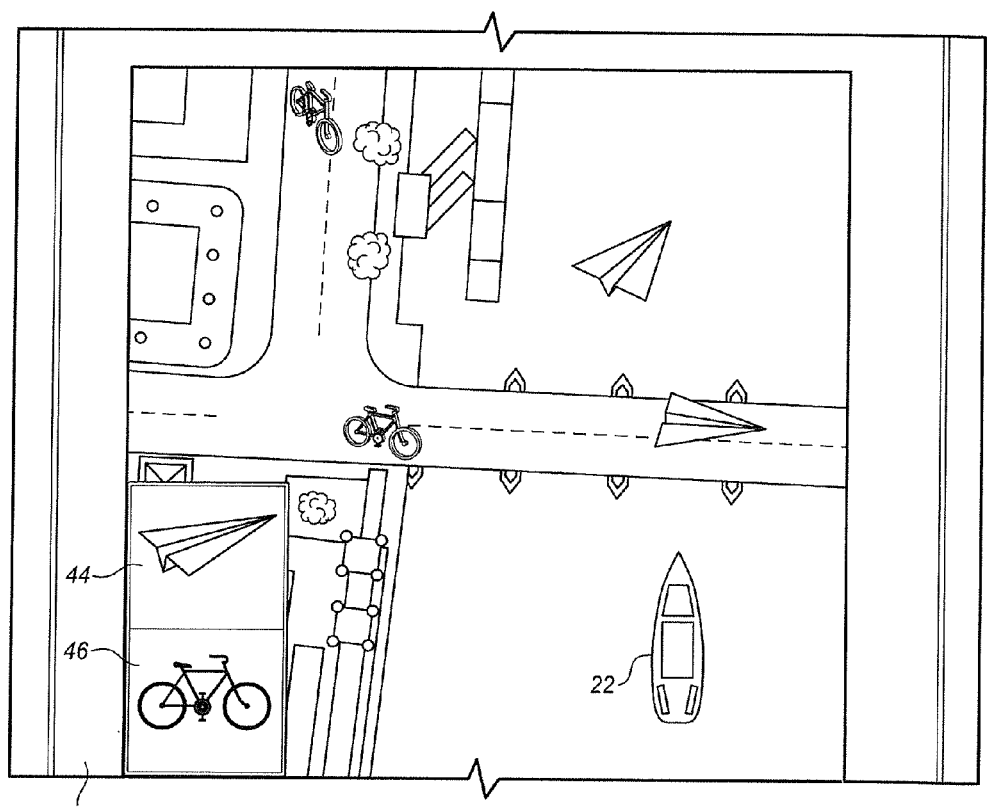
FIG. 4 is diagram of the real scene of FIG. 1 showing virtual objects controlled by the user according to an embodiment of the invention.

FIG. 4 shows a diagram of the same received archival image of FIG. 1 augmented with virtual message objects. In the diagram of FIG. 4, augmented reality virtual message or communication objects are generated and applied to the archived image to send messages to other users. The objects are selected from a control panel at the left side of the image. The user selects from different possible conveyances 44, 46, in this case a paper airplane and a bicycle. The user selects a vehicle and a recipient and then sends the message using the virtual vehicle. The local device may augment the virtual objects by showing their trajectory, action upon landing on different objects and other effects. The trajectory can be affected by actual weather conditions or by virtual conditions generated by the device.

A display such as that of FIG. 4 may appear in response to selecting "send" for any type of message or it may be launched from a separate program. The display may be incorporated into another program, such as a communication program or a game. In addition to selecting a virtual object, the user may also be provided with options to select sound effects, such as an engine or air noise, and haptic effects, such as impacts or vibrations. Such enhancements may also be included as a part of selecting the virtual object.

Figure 5:
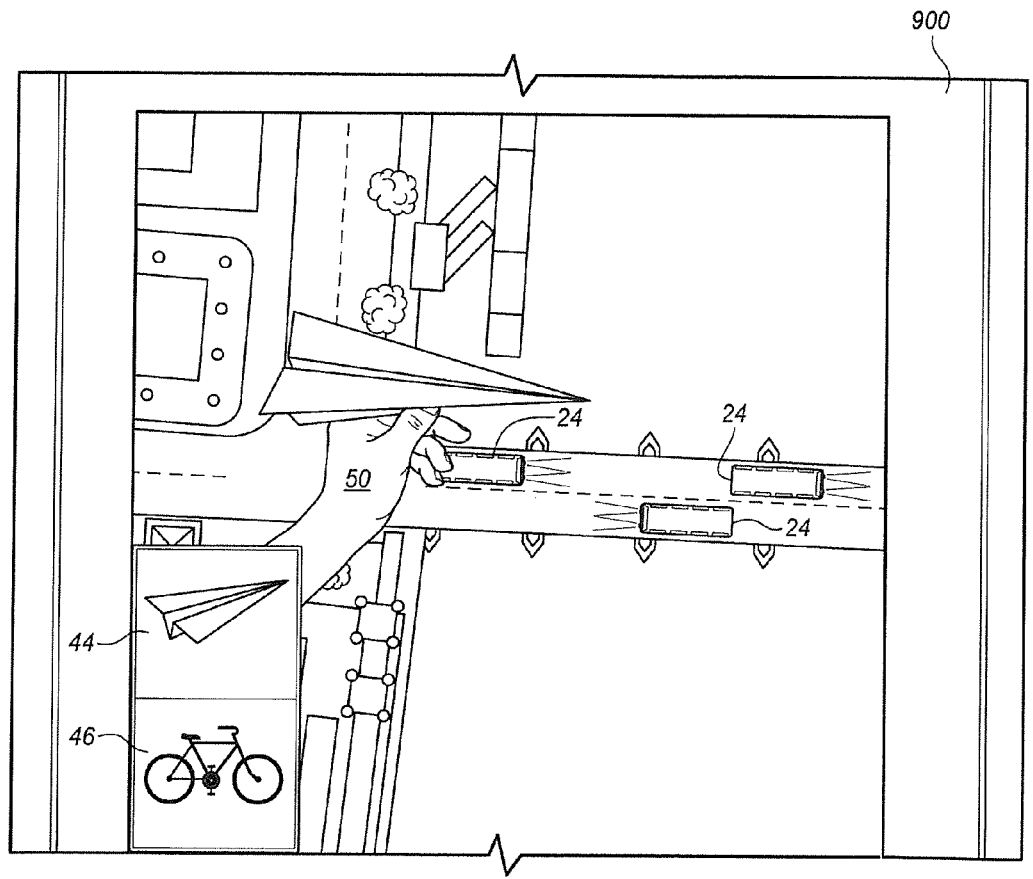
FIG. 5 is diagram of the real scene of FIG. 4 showing virtual objects controlled by the user and a view of the user according to an embodiment of the invention.

FIG. 5, shows an additional element of configuring a message in a diagram based on the diagram of FIG. 4. In this view, the user sees his hand 50 in the sky over the scene as a message sending controller. In this example, the user drops the message carrying vehicle onto another one of the identified users. The first user may actually be on the bridge, so the camera on the user's phone has detected the buses. In a further variation, the user could zoom down further and see a representation of himself and the people around him.

Figure 6A:
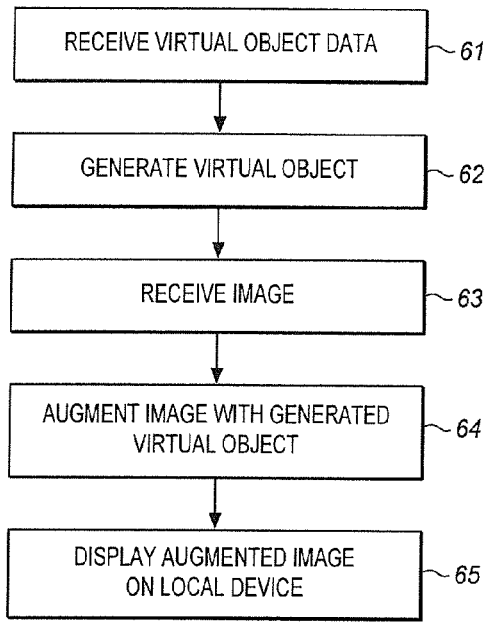
FIG. 6A is a process flow diagram of augmenting a received image with a generated virtual object according to an embodiment of the invention.

FIG. 6A is a process flow diagram of receiving a message at one user from another using augmented reality. At 61, the receiving user receives virtual object data at the user's own local device from the remote sending user. This information may identify, describe or fully characterize the virtual vehicle that will be used to convey the message through virtual or real space. The information may also include location data, account, or identification information of the remote user. Avatars for use for by the receiver and any other information that the remote sending user may want to send. The information may also include a description, picture, diagram or other visual information describing the appearance of the remote user's location. This information can be used by the receiver of the message to render an image of the message being sent from the remote user.

At 62, the local device generates a virtual object using any received virtual object data. This object may resemble a paper airplane or bicycle as shown above or any other object or person real or imagined. At 63, the receiving user's device receives an image from a remote image store or from the remote sending user. Alternatively, the image may be a real image of the immediate surrounding received from a remote source or observed by a camera or other sensor on the local device. For a remote sender, the receiver may receive location information from the remote sender and then retrieve a satellite image of that location.

At 63, the local device augments the received image by adding the generated virtual object to the image. This shows the progress of the message in the form of a virtual object on its way to the receiver. At 64, the augmented received image is displayed to the virtual user on the local device. This may be repeated by adding the virtual object message to multiple images to show the progress of the virtual object message in traveling a path to the receiver. The additional image may be selected to show locations between the sender and the receiver as the message travels the path. The virtual object message may also be represented as moving across the received image as though it is traveling through the displayed space on its way to the user. The virtual object may be accompanied by sound and haptic effects.

The user experience may be enhanced by adding additional virtual and real objects to the received image and by showing these objects as moving. This make the received image fresher and make the scene appear more realistic. As described below the receiver may capture the message and then reply to the message in a variety of different ways.

Figure 6B:
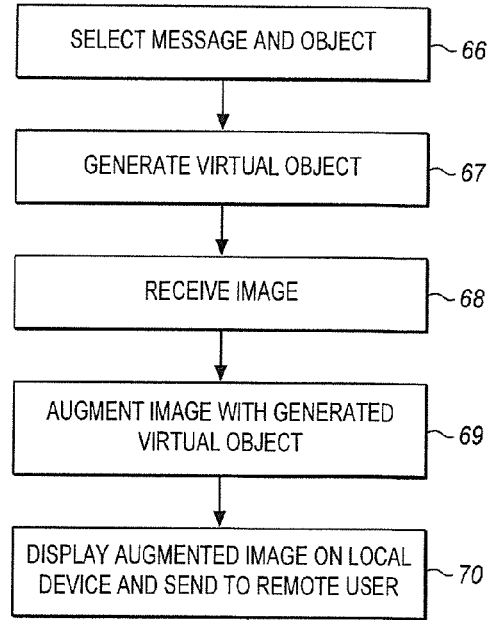
FIG. 6B is a process flow diagram of sending a message using an augmenting an archival image with virtual objects according to an embodiment of the invention received

FIG. 6B is a process flow diagram of sending a message from a local user to a remote user using augmented reality. At 66, the local user selects a message and a virtual object to carry the message. The message may be a text, media file, or objects in a game context such as resources, weapons, etc. The particular technical nature of the nature may be SMS, e-mail, network file transfer or interactive game messaging, among others.

At 67, the local system generates the virtual object and its association with the message. At 68, the local system retrieves an image. As for the receiver, this may be an archival image from a remote server based on the user's location whether real or fanciful. Alternatively, it may be received from a camera or other sensor of the local device. At 69, the received image is augmented with the virtual message object and at 70, the image is presented on a display to the user. Instead or in addition, the same augmented image may be presented to the receiver on the remote user's local device.

After sending the virtual object message, the user may also guide the path of the virtual object across the displayed image and onto other images that are retrieved as the virtual object moves along its path. This guided path of the virtual object may be communicated to the receiver so that both users see the same path of the virtual object message.

Additional operations may be performed such as sending the a notification to the remote user to indicate that a message is coming, sending and receiving acknowledgments and reactions to the message and sending information to the remote user that may be used to augment images on the remote user's device.

The virtual object message may be shown as a static object or as a moving object across any of the images. The images may also be followed by another image in a video sequence of images. The images may also be moved on a display by panning, zooming and other effects to create a sense of motion.

Figure 7A:
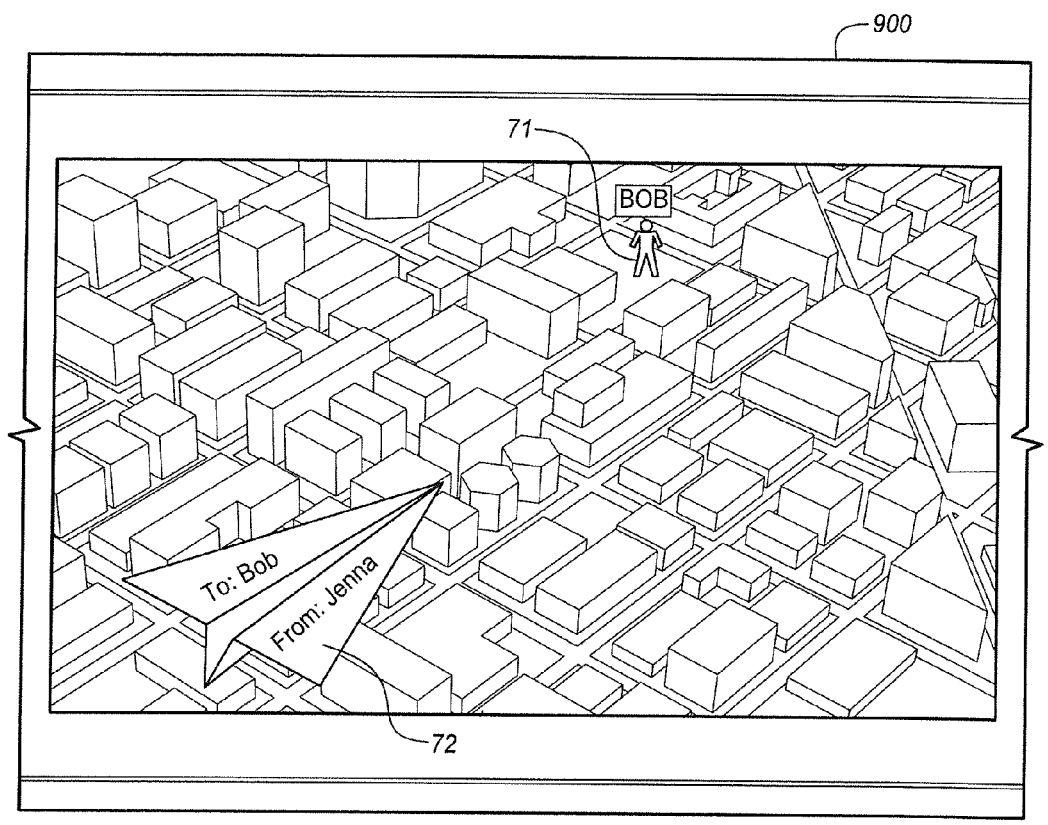
FIG. 7A is a diagram of a real scene from a remote image store augmented with a virtual object according to another embodiment of the invention.

FIG. 7A shows an example of sending a message by presenting virtual objects superimposed over received images. The received image may be augmented by the local device as described above in the context of FIG. 2 or be used without any changes. In this example, a message 72 is sent from Bob to Jenna. Bob has sent an indication of his location to Jenna and this location has been used to retrieve an archival image of an urban area that includes Bob's location. Bob's location is indicated by an avatar labeled by a balloon 71. The balloon may be provided by the local device or by the source of the image. As in FIG. 1, the image is a satellite image with street and other information superimposed. The representation of Bob's location may be rendered as a picture of Bob, an avatar, an arrow symbol, or in any other way. The actual position of the location representation may be changed if Bob sends information that he has moved or if the local device camera observes Bob's location as moving.

In addition to the archival image and the representation of Bob, the local device has added a virtual object 72, shown as a paper airplane, however, it may be represented in many other ways instead. The virtual object in this example represents a message. The message may be chat text, SMS (Short Message Service) text, e-mail, or communications from within a web browser account or page or any other type of communication. The communication may also be in the context of game play, as an example, the object may be information, additional munitions, a reconnaissance probe, a weapon, or an assistant.

The virtual object is launched using a suitable gesture by the sender, such as touching a button or a touch screen, or performing an air gesture or a touch screen gesture. The sender may design a special flight path or special effects (e.g., sparks) to make the message delivery more customized and personal. The way the sender launches the message may also influence the flight path and how the delivery occurs. In addition, the virtual message object may be affected by local conditions that are detected or received by the device generating the virtual object and controlling its path.

The remote sender may have a capability to control the paper airplane by tipping the phone, operating a joystick, or providing some other input until the message reaches the recipient. If the path or trajectory of the virtual object is determined by the sender's device, then the sender's device can incorporate additional user input into the determined trajectory. Otherwise, the sender's device may still send user input to the device that is determining the trajectory.

The paper airplane is shown traveling across the received image from Jenna to Bob. As a paper airplane it flies over the satellite image. If the message were indicated as a person or a land vehicle, then it may be represented as traveling along the streets of the image. The view of the image may be panned, zoomed, or rotated as the virtual object travels in order to show its progress. The representation of FIG. 7A may be shown on either the sender's screen, the receiver's screen or both. Either one or both of the devices may generate the representation. If only one device generates the representation, then it may send that representation to the other device for display.

The paper airplane may be accompanied by sound effects of rushing wind or leaves blown by the flight of the airplane. For other types of virtual objects, there may be other sounds such as thumping, singing, calling, growling, various spoken expressions, or various motor or mechanical noises. These sounds may be played on both user's devices. These additional effects may be sent with the virtual object from the sender to the receiver, from a server to the receiver, or they may be included in a program that is stored on the receiver's device.

Figure 7B:
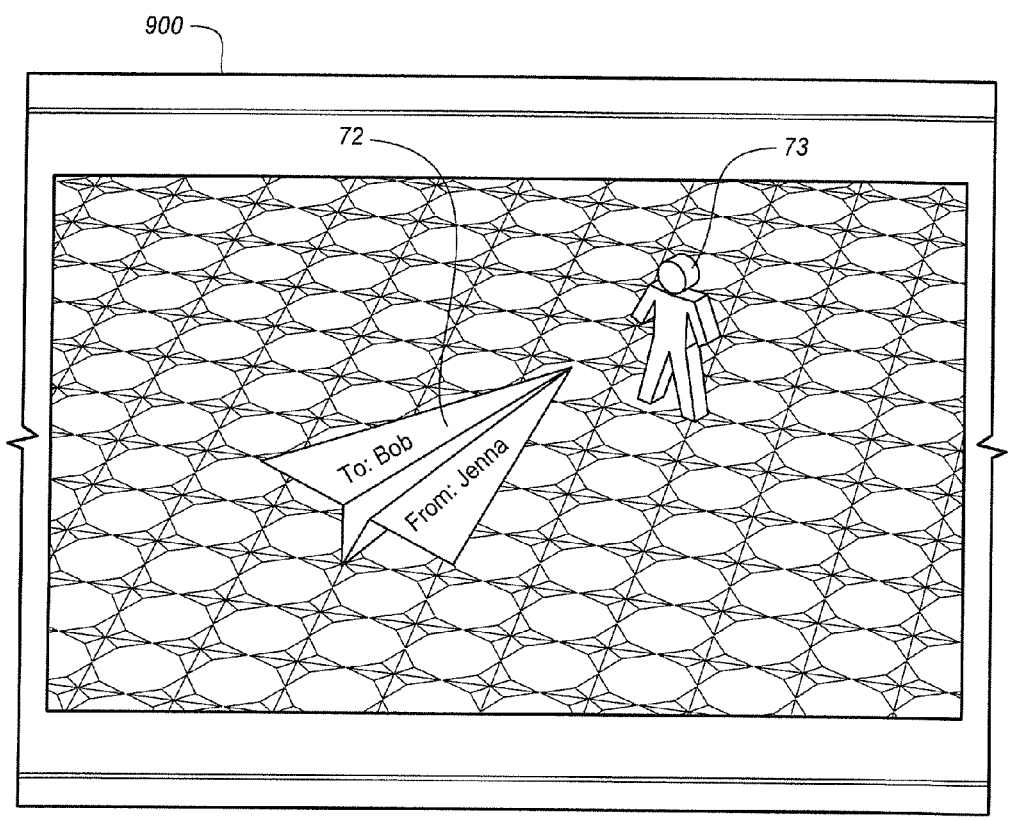
FIG. 7B is a diagram of a real scene from a remote image store augmented with a virtual object and an avatar of another user according to another embodiment of the invention.

In FIG. 7B, the image has been zoomed in as the message comes close to its target. In this case Bob is represented using an avatar 73 and is shown as ready to catch the message 72. As before, Bob can be represented in any of a variety of different realistic or fanciful ways. The received image may be a zoomed in satellite map, or as in this example, a photograph of a paved park area that coincides with Bob's location. The photograph may come from a different source, such as a web site that describes the park. The image may also come from Bob's own smart phone or similar device. Bob may take some photographs of his location and send those to Jenna. Jenna's device may then display those augmented by Bob and the message. The image may be further enhanced with other characters or objects both virtual and real.

FIG. 7C shows an example of Bob or any recipient receiving the message. The recipient may receive an alert that a message is on its way, and the recipient may look for the augmented reality paper airplane through his or her phone screen 73. The alert may come using push notifications or through any of a variety of other systems. The sender and the recipient may be presented with an aerial view of his or her own location as well as the location of the other user.

If the recipient is indoors, and there is no information about the interior environment, then the animation may stop outside. This is shown in the example of FIG. 7B in which the recipient 71 receives the message 72 outdoors. On the other hand, if data about the interior of the location is available to the sender's device, then that interior environment may be shown. When a receiving user is inside a home, if the receiver has opted into this kind of communication with the sender, a representation of the inside of the home could be included. Maps of internal spaces of public buildings are publicly available for some buildings. Map of private spaces are already produced by some products. Alternatively, an imaginary interior environment may be used. For games, an approximation of the environment may be satisfactory. For some games, a stylized appearance of the environment with a lower level of realism may be used. Alternatively, a game-based interior may be used. Instead of a family room or bedroom interior a ship's bridge, a command center, or a castle interior may be preferred, for example.

In the example of FIG. 7C, the message again in the form of the paper airplane follows the recipient who is a passenger in the backseat of a moving car. The passenger looks out the window 76 and sees that the sender is flying the virtual reality plane alongside the car. An accompanying text message received on the local device may say, "Look out your window, I'm following you!" This is made possible if the recipient has sent location information that allows the sender to follow the moving car. Alternatively, the virtual plane may be visible only to the recipient. The sender after sending the message may receive a confirmation such as that in FIG. 7B even if the recipient is not standing outside in a park but is riding in a car as shown in FIG. 7C.

As shown in FIG. 7C, the receiver has moved a smart phone in front of the window of a car. The smart phone provides an augmented reality display be first showing the environment behind the smart phone using a rear facing camera. The real scene outside the window may be a video of the real scene that changes as the care moves down the street. A similar approach may be used by holding the smart phone up to a window of a house or other building or holding the smart phone up to an outside scene such as that of FIG. 1. The smart phone also shows the virtual object paper airplane as an augmented reality character. The airplane may be controlled by the sender or it may be generated by the receiver's smart phone completely autonomously. The paper airplane may be associated with the particular position relative to the car window or the exterior scene so that the recipient must move the smart phone in order to find and capture the virtual object. A variety of different capture techniques, such as those common in computer gaming, may be used to challenge the recipient to capture the message, if desired.

Similarly audio and haptic effects may be provided to the receiver when it is time to receive the message. The receiver may be presented with a sound associated with the type of virtual object. There may also be sounds associated with capturing the object. When the sender selects the airplane, the sender might also select a sound effect (e.g., a jet engine) to occur when the plane appears on the receiver's display. When the plane virtually flies into the recipients display, the user may feel a vibration in the phone that coincides with the virtual impact of the jet plane against the user's display. Other types of AR characters may make a noise upon being captured by the receiver.

The recipient may also make the experience special for the sender by gesturing with the receiving device when receiving the message. In the illustrated example, the user 74 lifts the smart phone display 73 up to the car window 76 to "catch" the message 72. The receiver may represent him or herself to the sender with an avatar, showing some physical reaction of the avatar to the message. This may be presented to the user as part of the virtual reality map that shows the receiver in a special context, such as that of FIG. 7B. The receiver may also use a gesture to indicate a desire to see the message right away or save it for later.

In the example of FIG. 7C, the sender sends the AR message to a passenger riding in a car. The system may or may not use local data from the recipient's phone to see a representation of the receiver driving down the road. The receiver may use AR to see the message regardless of whether the sender sees the car or is informed of the precise location of the receiver. In one example, the sender IMs the receiver to alert him about the AR message. Local sensor data from the receiver's device allows the system to show the sender when the receiver has the device's camera pointed toward the AR message. This tells the sender when the receiver is looking and looking for the message.

The recipient of the message may have a variety of different ways to interact with the sender. First, the recipient may indicate that he is looking for the incoming message. The recipient 74, as mentioned above, may also send specific details about his location and the appearance of the environment. The location and environment may be real or imagined. For example, the recipient may indicate that he is inside a castle armory in a fantasy world and send images of that world. The recipient may also send images or avatars of himself. These may also be real or fanciful images.

The recipient may also send a reaction to the message to the sender. This may be a simple reply or it may be a real or selected emotion. In one example, a user receives a message and then is prompted to allow/disallow the smart phone to use the front camera to determine a facial expression. The actual captured expression may be sent to the sender or an avatar showing the expression may be sent.

Figure 7D:
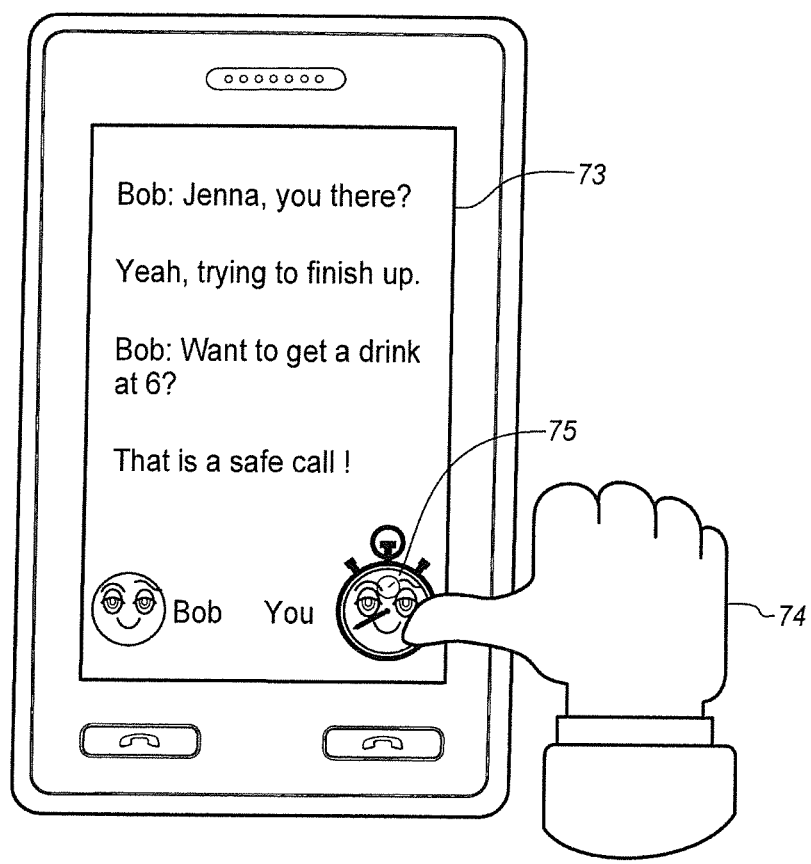
FIG. 7D is a diagram of a user interface for sending feedback to another user according to another embodiment of the invention.

In FIG. 7D, the user presses a face icon 75 to allow his smart phone to recognize his expression, generate a representation of that expression and then send that expression to the sender. The smart phone may first present the recognized expression on the screen 73 for approval by the user before sending the expression. The user might confirm by, for example, pressing the same face icon for a longer period, such as 1 or 2 seconds. In a similar way, the user might use touch screen commands to control the sending of additional expressions or convert the communication to a video call.

FIG. 7D shows that IMs may also be exchanged during the course of or in response to sending and receiving the AR message. In the illustrated example, Jenna and Bob are now exchanging texts using IM, SMS, or another protocol in addition to sending avatars representing expressions.

The AR message using a virtual object to travel to the user is more engaging than a conventional approach of pressing an IM, or e-mail button. The message and its delivery may be customized in many different ways. This allows the sender to spend time and thought to make the sending of the message more interesting for the receiver. Showing the flight or path traversed by the message also shows the geography between the sender and the receiver. This may be educational as well as entertaining. If both users are mobile, then the two users might also learn how they may move to meet in person. In an urban context, a message may be sent to one user a few blocks away from the other user that might show the path to walk or drive to meet.

The user interface of FIGS. 4 and 7D may also be used for selection and control of the AR messages. The interface may be integrated with a contacts list, and provide options for the design of the AR message delivery. Touch screen gesture may be used to launch messages and acceptable types of return messages may also be determined.

As described above, embodiments of the present invention provide, augmenting a satellite image or any other stored image set with nearly real-time data that is acquired by a device that is local to the user. This augmentation can include any number of real or virtual objects represented by icons or avatars or more realistic representations.

Local sensors on a user's device are used to update the satellite image with any number of additional details. These can include the color and size of trees and bushes and the presence and position of other surrounding object such as cars, buses, buildings, etc. The identity of other people who opt in to share information can be displayed as well as GPS locations, the tilt of a device a user is holding, and any other factors.

Nearby people can be represented as detected by the local device and then used to augment the image. In addition, to the simple representations shown, representations of people can be enhanced by showing height, size, and clothing, gestures and facial expressions and other characteristics. This can come from the device's camera or other sensors and can be combined with information provided by the people themselves. Users on both ends may be represented on avatars that are shown with a representation of near real-time expressions and gestures The received images may be satellite maps and local photographs, as shown, as well as other stores of map and image data. As an example, internal map or images of building interiors may be used instead or together with the satellite maps. These may come from public or private sources, depending on the building and the nature of the image. The images may also be augmented to simulate video of the location using panning, zooming and tile effects and by moving the virtual and real objects that are augmenting the image.

Figure 8:
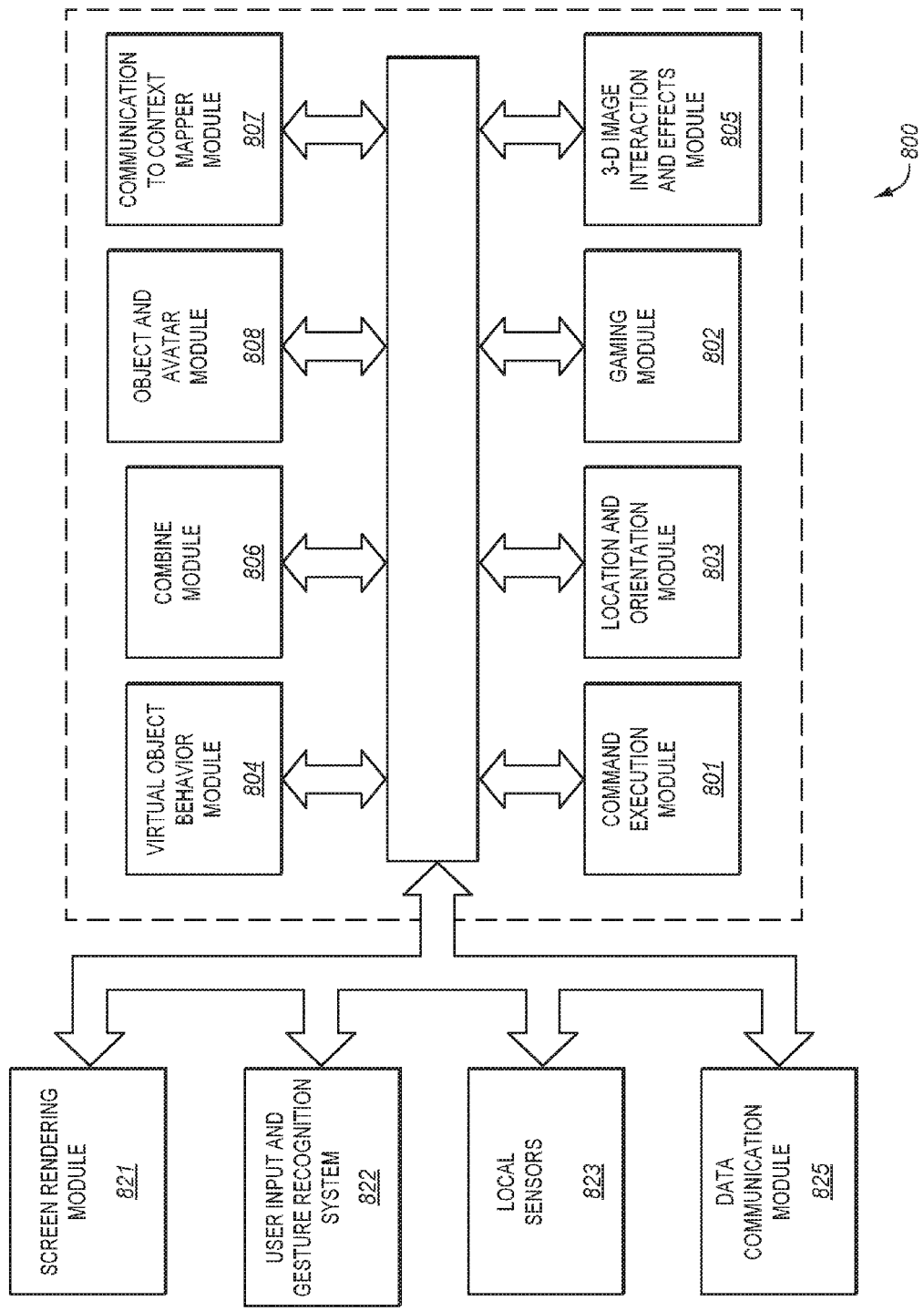
FIG. 8 is block diagram of a computer system suitable for implementing processes of the present disclosure according to an embodiment of the invention.

FIG. 8 is a block diagram of a computing environment capable of supporting the operations discussed above. The modules and systems can be implemented in a variety of different hardware architectures and form factors including that shown in FIG. 9.

The Command Execution Module 801 includes a central processing unit to cache and execute commands and to distribute tasks among the other modules and systems shown. It may include an instruction stack, a cache memory to store intermediate and final results, and mass memory to store applications and operating systems. The Command Execution Module may also serve as a central coordination and task allocation unit for the system.

The Screen Rendering Module 821 draws objects on one or more screens of the local device for the user to see. It can be adapted to receive the data from the Virtual Object Behavior Module 804, described below, and to render the virtual object and any other objects on the appropriate screen or screens. Thus, the data from the Virtual Object Behavior Module would determine the position and dynamics of the virtual object and associated gestures, and objects, for example, and the Screen Rendering Module would depict the virtual object and associated objects and environment on a screen, accordingly.

The User Input and Gesture Recognition System 822 may be adapted to recognize user inputs and commands including hand and harm gestures of a user. Such a module may be used to recognize hands, fingers, finger gestures, hand movements and a location of hands relative to displays. For example, the Object and Gesture Recognition Module could for example determine that a user made a gesture to drop or throw a virtual object onto the augmented image at various locations. The User Input and Gesture Recognition System may be coupled to a camera or camera array, a microphone or microphone array, a touch screen or touch surface, or a pointing device, or some combination of these items, to detect gestures and commands from the user.

The Local Sensors 823 may include any of the sensor mentioned above that may be offered or available on the local device. These may include those typically available on a smart phone such as front and rear cameras, microphones, positioning systems, WiFi and FM antennas, accelerometers, and compasses. These sensors not only provide location awareness but also allow the local device to determine its orientation and movement when observing a scene. The local sensor data is provided to the command execution module for use in selecting an archival image and for augmenting that received image.

The Data Communication Module 825 contains the wired or wireless data interfaces that allows all of the devices in the system to communicate. There may be multiple interfaces with each device. In one example, the AR display communicates over WiFi to send detailed parameters regarding AR characters. It also communicates over Bluetooth to send user commands and to receive audio to play through the AR display device. Any suitable wired or wireless device communication protocols may be used.

The Virtual Object Behavior Module 804 is adapted to receive input from the other modules, and to apply such input to the virtual object that have been generated and that are being shown in the display. Thus, for example, the User Input and Gesture Recognition System would interpret a user gesture and by mapping the captured movements of a user's hand to recognized movements, the Virtual Object Behavior Module would associate the virtual object's position and movements to the user input to generate data that would direct the movements of the virtual object to correspond to user input.

The Combine Module 806 alters the received image, such as a satellite map or other image to add information gathered by the local sensors 823 on the client device. This module may reside on the client device or on a "cloud" server. The Combine Module uses data coming from the Object and Person Identification Module 807 and add it to images from image source. Objects and people are added to the existing image. The people may be avatar representations or more realistic representations.

The Combine Module 806 may use heuristics for altering the satellite maps. For example, in sending a message in the form of racing airplanes that try to hit an avatar of a person or character that is to receive the message, the local device gathers information that includes: GPS location, hair color, clothing, surrounding vehicles, lighting conditions, and cloud cover. This information may then be used to construct avatars of the receiver, surrounding objects, and environmental conditions to be visible on the satellite map. For example, a user could fly the virtual plane message behind a real cloud that was added to the stored satellite image.

The Object and Avatar Module 808 receives information from the other users and a library of known users and represents this information as objects and avatars. The module may be used to represent any real object as either a realistic representation of the object or as an avatar. Avatar information may be received from other users, or a central database of avatar information.

The Object and Avatar Module may use received camera data to identify particular real objects and persons. Large objects such as buses and cars may be compared to image libraries to identify the object. People can be identified using face recognition techniques or by receiving data from a device associated with the identified person through a personal, local, or cellular network.

Having identified objects and persons, the identities can then be applied to other data to generate suitable representations of the objects and people for display.

The Location and Orientation Module 803 uses the local sensors 823 to determine the location and orientation of the local device. This information is used to select an archival image and to provide a suitable view of that image. The information may also be used to supplement the object and person identifications. As an example, if the user device is located on the Westminster Bridge and is oriented to the east, then objects observed by the camera are located on the bridge. The Object and Avatar Representation Module 808 using that information, can then represent these objects as being on the bridge and the Combine Module can use that information to augment the image by adding the objects to the view of the bridge.

The Gaming Module 802 provides additional interaction and effects. The Gaming Module may generate virtual characters and virtual objects to add to the augmented image. It may also provide any number of gaming effects to the virtual objects or as virtual interactions with real objects or avatars. The game play of e.g. FIGS. 4, 7A and 7B may all be provided by the Gaming Module.

The 3-D Image Interaction and Effects Module 805 tracks user interaction with real and virtual objects in the augmented images and determines the influence of objects in the z-axis (towards and away from the plane of the screen). It provides additional processing resources to provide these effects together with the relative influence of objects upon each other in three-dimensions. For example, an object thrown by a user gesture can be influenced by weather, virtual and real objects and other factors in the foreground of the augmented image, for example in the sky, as the object travels.

The Communication and Context Mapper Module 807 takes advantage of existing technologies for tracking a user's location and context. This may include both the sender and the receiver. In addition the module may track whether people are driving or performing other tasks that would make it appropriate or not appropriate to send an AR message. The allowed methods of AR message delivery may be matched to these user contexts. For example, if the user is a passenger and not a driver of a moving vehicle, the Mapper would allow a message to be sent real time. If the user has indicated that he is in a meeting then the Mapper would postpone delivery until the person is unoccupied.

Figure 9:
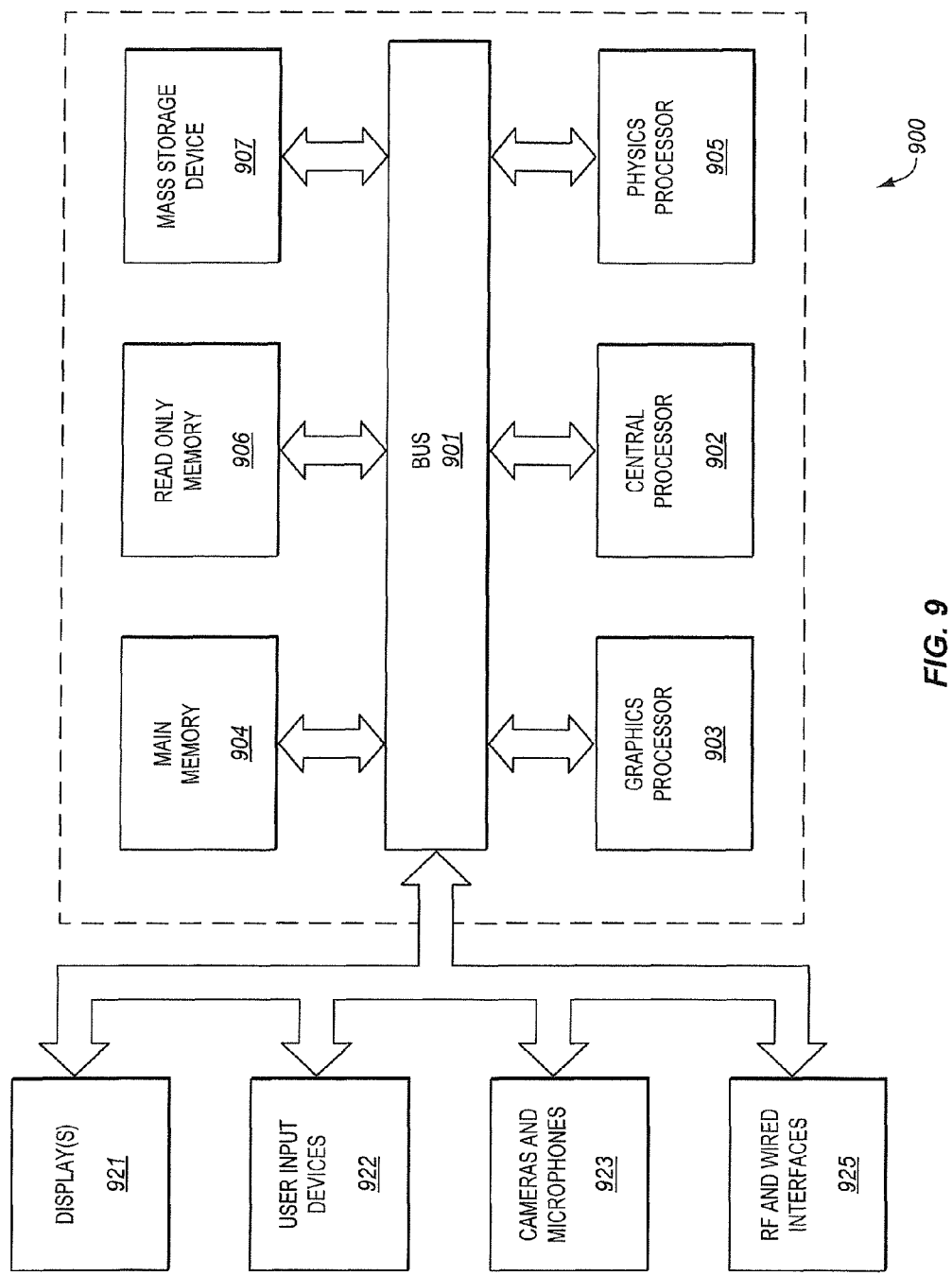
FIG. 9 is a block diagram of a an alternative view of the computer system of FIG. 8 suitable for implementing processes of the present disclosure according to an embodiment of the invention.

FIG. 9 is a block diagram of a computing system, such as a personal computer, gaming console, smart phone or portable gaming device. The computer system 900 includes a bus or other communication means 901 for communicating information, and a processing means such as a microprocessor 902 coupled with the bus 901 for processing information. The computer system may be augmented with a graphics processor 903 specifically for rendering graphics through parallel pipelines and a physics processor 905 for calculating physics interactions as described above. These processors may be incorporated into the central processor 902 or provided as one or more separate processors.

The computer system 900 further includes a main memory 904, such as a random access memory (RAM) or other dynamic data storage device, coupled to the bus 901 for storing information and instructions to be executed by the processor 902. The main memory also may be used for storing temporary variables or other intermediate information during execution of instructions by the processor. The computer system may also include a nonvolatile memory 906, such as a read only memory (ROM) or other static data storage device coupled to the bus for storing static information and instructions for the processor.

A mass memory 907 such as a magnetic disk, optical disc, or solid state array and its corresponding drive may also be coupled to the bus of the computer system for storing information and instructions. The computer system can also be coupled via the bus to a display device or monitor 921, such as a Liquid Crystal Display (LCD) or Organic Light Emitting Diode (OLED) array, for displaying information to a user. For example, graphical and textual indications of installation status, operations status and other information may be presented to the user on the display device, in addition to the various views and user interactions discussed above.

Typically, user input devices, such as a keyboard with alphanumeric, function and other keys, may be coupled to the bus for communicating information and command selections to the processor. Additional user input devices may include a cursor control input device such as a mouse, a trackball, a trackpad, or cursor direction keys can be coupled to the bus for communicating direction information and command selections to the processor and to control cursor movement on the display 921.

Camera and microphone arrays 923 are coupled to the bus to observe gestures, record audio and video and to receive visual and audio commands as mentioned above.

Communications interfaces 925 are also coupled to the bus 901. The communication interfaces may include a modem, a network interface card, or other well known interface devices, such as those used for coupling to Ethernet, token ring, or other types of physical wired or wireless attachments for purposes of providing a communication link to support a local or wide area network (LAN or WAN), for example. In this manner, the computer system may also be coupled to a number of peripheral devices, other clients, or control surfaces or consoles, or servers via a conventional network infrastructure, including an Intranet or the Internet, for example.

It is to be appreciated that a lesser or more equipped system than the example described above may be preferred for certain implementations. Therefore, the configuration of the exemplary systems 800 and 900 will vary from implementation to implementation depending upon numerous factors, such as price constraints, performance requirements, technological improvements, or other circumstances.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection). Accordingly, as used herein, a machine-readable medium may, but is not required to, comprise such a carrier wave.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A method comprising:
   receiving virtual message object data at a local device from a remote user, the data describing a virtual vehicle that will virtually convey a message from the remote user that is sending the message to the local device that is receiving the message;
   determining a real position of the remote user;
   determining a real position of the local device;
   generating the virtual vehicle and its association with the message at the local device as a virtual object using the received virtual message object data;
   receiving an image at the local device, the image being of an area that includes the remote user position;
   augmenting the received image at the local device by adding the generated virtual object to the received image at the remote user position;
   displaying the augmented image on the local device;
   determining the local device position on the augmented image; and
   launching the conveying of the message by the virtual vehicle at the local device in response to a user command at the local device, the conveying corresponding to the virtual vehicle with the message virtually moving across the augmented image from the remote user position toward the local device position, the conveying beginning after launching.

2. The method of claim 1, wherein receiving virtual message object data comprises receiving location data regarding the remote user position from the remote user and wherein augmenting the received image comprises adding the generated virtual object at a location in the received image corresponding to the received location data.

3. The method of claim 2, wherein augmenting the received image comprises adding the generated virtual object at locations between the location corresponding to the received location data and the local device position over time and wherein displaying the augmented image comprises displaying the virtual object in motion across the augmented image between the location corresponding to the received location data and the local device position.

4. The method of claim 1, wherein receiving an image comprises receiving a plurality of images for locations between the remote user position and the local device position and wherein augmenting the received image comprises adding the generated virtual object to the received images to display the virtual object in motion across the images in a sequence corresponding to travel between the remote user position and the local device position.

5. The method of claim 4, wherein the travel between the remote user position and the local device position corresponds to a route selected by the remote user.

6. The method of claim 4, further comprising:
receiving an alert from the remote user to look for the virtual object;
receiving user input at the local device in response to the alert; and
modifying a course of travel between the remote user position and the local device position based on the user input.

7. The method of claim 6, wherein the user input comprises direction commands.

8. The method of claim 1, wherein the virtual object corresponds to travel of the message conveyed by the virtual vehicle as it is sent from the remote user to the local device.

9. The method of claim 8, further comprising receiving user input at the local device to interact with the virtual object and displaying the interaction on the augmented image on the local device.

10. The method of claim 8, further comprising receiving an alert from the remote user to look for the sent message as it is conveyed by the virtual vehicle.

11. The method of claim 10, further comprising receiving user input at the local device in response to the alert, the user input affecting the course of travel of the sent message conveyed by the virtual vehicle from the remote user position to the local device position.

12. The method of claim 10, further comprising receiving user input at the local device in response to the alert, the user input allowing the local device to virtually capture the virtual object corresponding to the sent message.

13. The method of claim 10, further comprising:
capturing a facial expression of a user of the local device after receiving the alert;
converting the facial expression to an avatar representing the facial expression; and
sending the avatar to the remote user.

14. The method of claim 13, further comprising sending the local device position to the remote user with the avatar.

15. The method of claim 13, further comprising sending an image of the local device position to the remote user with the avatar.

16. The method of claim 1, wherein generating a virtual object comprises generating audio and haptic effects for the virtual object and wherein displaying the augmented image comprises producing audio and haptic effects associated with the virtual object.

17. A local device comprising:
a data communication module to receive virtual message object data from a remote user and to receive an image at the local device, the data describing a virtual vehicle that will virtually convey a message from the remote user to the local device, the image being of an area that includes a real position of the remote user;
a combine module to generate the virtual vehicle and its association with the message at the local device as a virtual object using the received virtual message object data and to augment the received image at the local device by adding the generated virtual object to the received image;
a location determination system to determine the real position of the remote user, to determine a real position of the local device, and to determine the position of the local device on the augmented received image;
a screen rendering module to display the augmented image on the local device and to launch the conveying of the message by the virtual vehicle of the virtual object at the local device in response to a user command at the local device, the conveying corresponding to the virtual vehicle with the message virtually moving across the augmented image from the remote user position toward the local device position, the conveying beginning after launching.

18. The local device of claim 17, wherein the combine module adds the generated virtual object at locations between the remote user position and the local device position over time and wherein the augmented image shows the virtual object in virtual motion across the augmented image between the remote user position and the local device position.

19. The local device of claim 18, further comprising a user input system of the local device to receive direction commands and wherein the combine module modifies the motion of the virtual object based on the received direction commands.

20. The local device of claim 19, further comprising:
a camera to capture a facial expression of a user of the local device; and
an avatar representation module to generate an avatar representing the captured facial expression,
wherein the data communication module sends the generated avatar to the remote user.

21. A machine-readable non-transitory medium having instruction thereon that, when operated on by the machine cause the machine to perform operations comprising:
receiving virtual message object data at a local device from a remote user, the data describing a virtual vehicle that will virtually convey a message from the remote user to the local device;
determining a real position of the remote user;
determining a real Position of the local device;
generating the virtual vehicle and its association with the message at the local device as a virtual object using the received virtual message object data;
receiving an image at the local device, the image being of an area that includes the remote user position;

augmenting the received image at the local device by adding the generated virtual object to the received image at the remote user position;

displaying the augmented image on the local device;

determining the local device position on the augmented image; and launching the conveying of the message by the virtual vehicle at the local device in response to a user command at the local device, the conveying corresponding to the virtual vehicle with the message virtually moving across the augmented image from the remote user position toward the local device position, the conveying beginning after launching.

22. An apparatus comprising:

a communications interface to receive virtual message object data from a remote user and to receive an image at a local device, the data describing a virtual vehicle that will virtually convey a message from the remote user to the local device, the image being of an area that includes a real position of the remote user;

a processor having a combine module to generate a virtual vehicle as a virtual object and its association with the message using the received virtual message object data and to augment the received image at the local device by adding the generated virtual object to the received image;

a positioning system receiver to determine a position of the local device;

a display to display the augmented image on the local device; and an interface to present a launch command to launch conveying the message by the virtual vehicle at the local device, the conveying corresponding to the virtual vehicle with the message virtually moving across the augmented image from the remote user position toward the local device position, the conveying beginning after launching.

23. The apparatus of claim 22, wherein the processor augments the received image by adding the generated virtual object at locations between the remote user position and the local device position over time and wherein the processor renders the virtual object in motion across the received image between the remote user position and the local device position.

24. The apparatus of claim 23, further comprising a camera to capture a facial expression of a user of the local device after receiving an alert and wherein the processor converts the facial expression to an avatar representing the facial expression and the communications interface sends the avatar to the remote user.

* * * * *